United States Patent Office 3,442,679
Patented May 6, 1969

3,442,679
SULFONATED CARBON BLACKS
Donald Rivin, Framingham, Mass., Jerome Aron, Providence, R.I., and Leighton B. Richards, Cambridge, Mass., assignors to Cabot Corporation, Boston, Mass., a corporation of Delaware
No Drawing. Filed June 27, 1966, Ser. No. 560,904
Int. Cl. C09c 1/44
U.S. Cl. 106—307
8 Claims

ABSTRACT OF THE DISCLOSURE

A process is provided for the production of tar-free, substantially nonoxidized sulfonated carbon black. Broadly, said process comprises the contacting of carbon black with fuming sulfuric acid at a temperature below the decomposition temperature of the reactants. The sulfur trioxide forming part of the fuming sulfuric acid reacts with the carbon black thereby sulfonating same. Conveniently, the sulfonation reaction is terminated by quenching the reaction mixture with cold water or by neutralization of the reaction mixture with a basic salt.

This invention relates to a process for forming a composition of matter wherein carbon black is in chemical combination with sulfonic acid groups.

Sulfonation of carbon black is desirable for achieving a number of objects. For example, ion exchange materials can be prepared from sulfonated carbon black wherein advantage is obtained by the inert chemical and thermal properties of the black being combined with the high chemical reactivity and versatility of sulfonic acid groups on the surface thereof. Moreover, such sulfonated carbon blacks are especially useful, because of the hydrophilic character imparted by sulfonic acid groups to blacks used as fillers and pigments in paper and other cellulosic products. These sulfonated blacks are also especially useful as fillers in resins having a basic nature.

A number of processes are known to the art whereby sulfonated carbon blacks can be produced. For example, French patent 1,215,895 reveals a proces wherein large quantities of sulfonic acid groups are attached to a carbon black surface. However, the processes in the prior art present a considerable problem in view of the fact that it is extremely difficult to avoid oxidation of carbon black or tar formation from organic solvents used during the reaction with the sulfonating agent according to the prior art. Furthermore, many, if not all, of the aforementioned processes are desirably carried out at elevated temperatures rather than at ambient temperatures.

Therefore it is an object of the instant invention to provide a process for sulfonating carbon black wherein the oxidation of the carbon black is greatly reduced, and tar formation is avoided.

It is another object of the invention to provide a process for sulfonating carbon black at conveniently low temperatures.

Other objects of the invention are in part obvious and are in part set forth below.

In the process of the invention, a fuming sulfuric acid reaction medium is utilized. More specifically, the reaction of carbon black with a sulfur oxide gas is carried out in about 10 to 65% oleum. Thus commercially-available oleum such as sulfuric acid which contains 15 to 65% by weight thereof of sulfur trioxide is conveniently used in the process of the invention. The reaction can be carried out in a liquid slurry or, often more preferably, by only wetting the surface of the carbon black by spraying or dropwise addition of oleum thereon. If this latter method is used, the black should be well agitated during oleum addition.

The sulfonation reaction is conveniently carried out within the range of 15° C. to 70° C. but preferred temperatures are those between about 15 to 40° C. Lower temperatures will retard the reaction rate as is known to those skilled in the art. Higher temperatures will accelerate the reaction rate, but it is pointed out that the reactants should not be allowed to exceed their decomposition temperatures.

Assuming a reaction temperature of about 30° C., the preferred maximum temperature, when 65% oleum is used, it is usually convenient to allow the reaction between sulfur trioxide and carbon black to proceed for from about one hour to about two days depending upon the amount of sulfonation desired on the carbon black. Shorter reactions times are used if lesser quantities of sulfonic groups are desired on the black. Longer reaction times can be used but, after about 48 hours, surface oxidation (formation of quinone, phenol and carboxyl surface groups) is likely to become an increasing problem. However, if the reaction time is under 72 hours the sulfonated carbon black formed by the process of the invention is substantially free from tars and is also extraordinarily low in ash content.

For many purposes a reaction time of two hours at 30° C. is sufficient; the degree of sulfonation obtained in two hours is about 40% of that obtained with a reaction period of up to eight days. The reaction is preferably ended quickly. A convenient method for so ending the reaction is to quench the reaction mixture with ice water. However, a more convenient method is to form a salt such as—$SO_3Na$ salt by neutralizing the reaction mixture with a solution of a salt of a strong base and weak acid such as $Na_2CO_3$ or a salt of a weak base and weak acid such as $(NH_4)_2CO_3$. Only a small excess of the salt of a weak acid need be used. Preferred are salts such as the carbonates which decompose leaving no residual acid. Other salts such as those leaving residual acid or base can be used, but care must be taken to avoid hydrolysis of the sulfonic acid group.

Any channel, thermal or furnace carbon blacks may be treated in the process of the invention. However, in order to achieve a high degree of sulfonation most easily, it is desirable that the carbon black which is utilized as a raw material have a sufficient number of OH and H groups thereon to form favored positions for attack by the sulfur trioxide reactant.

In order to point out more fully the nature of the present invention, the following specific examples are given as illustrative embodiments of the present process and products produced thereby. In these examples the strong acid is reported as milliequivalents of sodium bicarbonate neutralized per gram of carbon black; the total acid is reported as milliequivalents of hydrogen evolved on reacting lithium aluminum hydride with a gram of carbon black; sulfur and ash are reported as a percent by weight of the sulfonated carbon black product; tinting strength is reported, according to the custom of the carbon black art, as a percentage of the tinting strength obtainable with a semireinforcing furnace black, and oil absorption is reported in cubic centimeters of oil absorbed by a gram of the black.

The aforementioned "strong acid" analysis is obtained by the following procedure:

Two grams of dry carbon black are weighed into an 8 ounce bottle and shaken therein for four hours in the presence of 50 ml. of an aqueous solution of 0.1 normal sodium bicarbonate. At the end of this period, the black is centrifugally separated off and 25 ml. of supernatant liquid is transferred into a 250 ml. Erlenmeyer flask containing about 30 ml. of distilled water and a small quantity of boiling beads. Also added to this flask is 50 ml. of 0.05 normal HCl. The contents of the flask are then boiled for twenty minutes to remove any carbonic acid present; then the contents are cooled.

The resultant liquid is back-titrated to neutrality with 0.02 N sodium hydroxide as determined by a phenolphthalein end point. Then a blank run is made by performing the above steps with no carbon black.

Thereupon it is possible to determine the quantity of strong acid sites in terms of milligram atoms of hydrogen per gram of carbon black by the following relation:

$$\frac{2 \text{ (normality of NaOH) (ml. of NaOH used for blank} - \text{ml. of NaOH used for sample)}}{\text{grams of carbon black}}$$

The aforementioned "total acid" analysis is obtained by the following procedure:

A sample of the carbon black to be tested is dried in a reaction flask for an hour between 230 and 250° F. under a pressure of less than 0.1 mm. Hg absolute. The flask is then filled with a dry inert gas such as nitrogen and allowed to come to room temperature, i.e. about 20 to 40° C. Thereupon a dilute solution of lithium aluminum hydride in bisethoxyethane is reacted with the black. After the first surge of hydrogen evolution, the sample is heated to 70° C. and stirred for one hour. The total hydrogen evolved over the period of one hour is utilized as a measure of total acidic hydrogen.

Example 1

An intermediate super abrasion furnace (ISAF) black, sold under the trade designation Vulcan 6 by Cabot Corporation was heat treated at 1000° C.±50° C. for 3 hours under nitrogen. Thereupon 150 grams of this black was stirred in 1500 ml. of 30% oleum for 72 hours at 28° C. The carbon black-oleum slurry was then poured onto ice to terminate the reaction. The cooled slurry was filtered and washed until a test of the filtrate for $-SO_4$ was negative. This test comprises adding $BaCl_2$ to the filtrate; a positive test is denoted by formation of a $BaSO_4$ precipitate. The solid carbon black-based product recovered in the filtration operation was dried in a forced draft oven until it reached a constant weight.

Analysis of the product revealed the following when compared to a non-sulfonated quantity of the same carbon-black with which the instant-working example was carried out.

|  | Sulfonated black | Control |
|---|---|---|
| Strong acid | 0.082 | 0.00 |
| Total acid | 1.03 | 0.20 |
| Percent sulfur | 1.26 | 0.4 |
| Percent ash | 0.08 | 0.26 |
| Tinting strength | 221 | 219 |
| Oil absorption | 1.26 | 1.30 |

Particularly noticeable and characteristic of the products of the invention is the very low ash content.

Example 2

150 grams of an intermediate super abrasion furnace (ISAF) black, sold nder the trade designation Vulcan 6 by Cabot Corporation, was slurried in 1500 ml. of 30% oleum for 72 hours at 28° C. The carbon black-oleum slurry was then poured on ice to stop the reaction. The cooled slurry was filtered and washed until the test for $BaSO_4$ was negative. The solid carbon black-based product recovered in the filtration operation was dried in a forced draft oven until it reached a constant weight.

Analysis of the product revealed the following when compared to a non-sulfonated quantity of the same carbon black with which the instant working example was carried out:

|  | Sulfonated black | Control |
|---|---|---|
| Strong acid | 0.105 | 0.02 |
| Total acid | 1.35 | 0.83 |
| Percent sulfur | 1.68 | 0.03 |
| Percent ash | 0.00 | 0.74 |
| Tinting strength | 221 | 215 |
| Oil absorption | 1.29 | 1.26 |

Example 3

A quantity of 150 grams of a medium color channel (MCC) black was stirred in 1500 ml. of 30% oleum for 72 hours at 28° C. The carbon black-oleum slurry was then poured on ice to terminate the reaction. The slurry was filtered and washed until the $BaCl_2$ test with the filtrate was negative. The solid carbon black-based product recovered in the filtration operation was dried in a forced draft oven until it reached a constant weight.

Analysis of the product revealed the following when compared to a non-sulfonated quantity of the same carbon black with which the instant-working example was carried out.

|  | Sulfonated black | Control |
|---|---|---|
| Strong acid | 0.48 | 0.095 |
| Total acid | 1.59 | 1.43 |
| Percent sulfur | 2.09 | 0.00 |
| Percent ash | 0.00 | 0.02 |
| Tinting strength | 304 | 300 |
| Oil absorption | 1.10 | 1.21 |

It is noted that the black of Example 3 is sulfonated to a greater degree than the black of Example 2, and that the black of Example 2 is more highly sulfonated than that of Example 1. This is believed, at least in part, to be due to the fact that there is more surface area available per gram on the black of Example 3 which has an average particle size of only 17 millimicrons as determined by inspection under an electron microscope. However the quantitative amount of sulfonation achieved under any given reaction conditions is believed to be more closely related to the number of surface groups on the black, particularly the amount of hydrogen and hydroxyl groups. The particle sizes of the blacks utilized in Examples 1 and 2 have average particle sizes of about 23 millimicrons, also as determined with an electron microscope.

The difference in sulfonation level between the products of Examples 1 and 2 however, is believed to be due to the removal from the carbon black used in Example 1 of many reactive sites during the heat treatment of the black at 1000° C.

Examples 4–6

A number of other blacks were treated according to the above-procedures excepting variations were made in percent oleum and time of treatment:

| Example | Type of black | Time (hrs.) | Percent oleum | Milliequivalents of $-SO_3H$ per gram of blk. |
|---|---|---|---|---|
| 4 | ISAF-CRF | 1 | 30 | 0.111 |
| 5 | ISAF | 24 | 30 | 0.177 |
| 6 | MCC | 4 | 65 | 0.826 |

In each case, the blacks showed low tar and ash content characteristic of products of the invention.

Example 7

A medium color channel (MCC) black (500 grams) sold under the trade designation Black Pearls 74 by Cabot Corporation was pre-dried and then, under a positive pressure of nitrogen and with good agitation, treated with 250 ml. of 65% oleum. The oleum was added dropwise to the black over 2 hours and the agitation was continued for another 2 hours, after which time the reaction was quenched and the black was dried at 350° F. A quantity of 1.36 milliequivalents of —$SO_3H$ was added per gram of black treated.

A particularly surprising aspect of the invention is the apparently catalytic or synergistic effect which the presence of sulfuric acid contributes to the ability of sulfur trioxide to react with carbon black. The following example is chosen to illustrate this effect.

Example 8

A 250 gram sample of predried medium color channel carbon black was treated with —$SO_3$ for 24 hours at a temperature of 30° C. The treatment was carried out by passing a stream of $SO_3$ gas through a mechanically stirred reactor holding the black. At the end of 24 hours, the black was analyzed and found to have only 0.137 milliequivalent per gram of sulfonic acid groups. It was further noted that a relatively large quantity of oxidized matter appeared as a by-product of the invention. Compare this small amount of reaction with the results of an oleum sulfonation of the same black in Example 6.

As observed from the foregoing examples the disclosed sulfonation of carbon black is effective in yielding a sulfonated black product containing at least about 0.1 milliequivalent of —$SO_3H$ groups per gram of black.

It is of course to be understood that the foregoing examples are intended to be illustrative and that numerous changes can be made in the ingredients, proportions and conditions set forth therein without departing from the spirit of the invention as defined in the appended claims.

What is claimed is:

1. A process for sulfonating carbon black while avoiding substantial (a) oxidation of said black, (b) formation of tarry by-product which process comprises contacting carbon black with sufficient fuming sulfuric acid having dissolved therein between about 10 and about 65 percent by weight of said sulfuric acid of sulfur trioxide at below the decomposition temperature of the reactants for a period of time sufficient to effect reaction between the sulfur trioxide and the carbon black to provide a sulfonated carbon black product having at least about 0.1 milliequivalents of $SO_3H$ groups per gram of carbon black.

2. A process as defined in claim 1 carried out at a temperature of up to about 40° C. for a period of up to about 72 hours.

3. A process as defined in claim 1 comprising the additional step of terminating the sulfonation reaction by adding a salt of a weak acid to the acidic reaction mixture.

4. A process as disclosed in claim 1 comprising the additional step of terminating the sulfonation reaction by quenching the reaction mixture with cold water.

5. A process as defined in claim 1 wherein said contact is effected by slurrying carbon black in said acid.

6. A process as defined in claim 1 wherein said contact is effected by wetting the black with said acid and agitating the resultant wetted mass.

7. A substantially tar free nonoxidized sulfonated carbon black product which is obtained by contacting carbon black with sufficient fuming sulfuric acid having dissolved therein between about 10 and about 65 percent by weight of said sulfuric acid of sulfur trioxide at below the decomposition temperature of the reactants for a period of time sufficient to effect reaction between the sulfur trioxide and the carbon black to provide a sulfonated carbon black product having at least about 0.1 milliequivalents of $SO_3H$ groups per gram of carbon black.

8. A sulfonated carbon black product as defined in claim 7 wherein said contacting is carried out by agitating the carbon black and the fuming sulfuric acid reactants at temperatures of up to about 40° C. for periods of up to about 72 hours.

References Cited

UNITED STATES PATENTS

| | | | |
|---|---|---|---|
| 2,631,107 | 3/1953 | Leatherman | 106—307 |
| 2,636,831 | 4/1953 | Carney | 106—307 |
| 2,641,535 | 6/1953 | Cines | 23—209.1 |
| 2,652,344 | 9/1953 | Simms | 106—307 |
| 3,042,649 | 7/1962 | Hawkins et al. | 23—209.1 |

TOBIAS E. LEVOW, *Primary Examiner.*

SAMUEL E. MOTT, *Assistant Examiner.*

U.S. Cl. X.R.

23—209.2